United States Patent
Jason, Jr. et al.

(10) Patent No.: US 6,728,243 B1
(45) Date of Patent: Apr. 27, 2004

(54) METHOD FOR SPECIFYING TCP/IP PACKET CLASSIFICATION PARAMETERS

(75) Inventors: James L. Jason, Jr., Hillsboro, OR (US); Michael D. Jeronimo, Wilsonville, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/430,674

(22) Filed: Oct. 28, 1999

(51) Int. Cl.[7] .......................... H04L 12/28; H04L 12/56
(52) U.S. Cl. .................. 370/392; 370/389; 370/395.43; 370/395.31
(58) Field of Search ................... 370/392, 401, 370/389–394, 395.31, 395.21, 395.42, 395.32, 395.52, 412, 395.43, 428, 422; 709/221, 223, 225, 238, 239; 713/201, 202, 200

(56) References Cited

U.S. PATENT DOCUMENTS

| | | | | |
|---|---|---|---|---|
| 5,644,571 A | * | 7/1997 | Seaman | 370/401 |
| 5,951,651 A | * | 9/1999 | Lakshman et al. | 370/389 |
| 6,347,376 B1 | * | 2/2002 | Attwood et al. | 713/201 |
| 6,529,508 B1 | * | 3/2003 | Li et al. | 370/392 |
| 6,567,408 B1 | * | 5/2003 | Li et al. | 370/395.31 |
| 6,570,876 B1 | * | 5/2003 | Aimoto | 370/389 |
| 6,597,661 B1 | * | 7/2003 | Bonn | 370/395.32 |

* cited by examiner

Primary Examiner—Wellington Chin
Assistant Examiner—Chuong Ho
(74) Attorney, Agent, or Firm—Blakely, Sokoloff, Taylor & Zafman LLP

(57) ABSTRACT

A method and a system for classifying a packet are disclosed. In one embodiment, at least one source address is grouped in a source group and at least one destination address is grouped in a destination group. In addition, at least one source port, one destination port, and one protocol are grouped in a protocol group. After grouping process, at least one rule is fetched according to the source group, destination group, or protocol group. After identifying the rule, specific treatment for the packet during the network transmission is identified in response to the rule or rules.

28 Claims, 6 Drawing Sheets

METHOD FOR SPECIFYING TCP/IP PACKET CLASSIFICATION PARAMETERS

BACKGROUND OF THE INVENTION

1. Field of the Invention

The present invention relates generally to the field of network communication, more specifically, the present invention relates to a method for classifying packets.

2. Description of the Related Art

With recent development of multimedia data processing in the Internet and the World Wide Web, such as, speech, sound, and imaging processing, new techniques for managing and transferring data packets over network communications are needed. Data packets are commonly referred to as small blocks of data sent across a packet switching network.

In network communications utilizing Internet protocol ("IP"), a data packet, which may contain audio and video ("AV") data, is typically transmitted using a conventional network protocol, such as, for example, TCP/IP ("Transmission Control Protocol/Internet Protocol"). TCP/IP is a standard network protocol that allows a packet to pass across the Internet with the best-effort packet delivery service.

In order to send a packet across a network, each packet must be classified so that the network administrator knows how to treat the packet while it travels across the network. Packet classification is a process that identifies the packets, such as, for example, TCP/IP packets. Once a packet is classified, the packet classification is used to determine what type of packet treatment, such as, for example, security requirements or quality of service, ("QOS"), should be used according to the policy of the network. The policy typically includes various rules.

To determine a proper packet treatment, a network administrator typically identifies rules according to the packet classification. Once the rules are found, a typical low-level packet processing method for comparing fields of the rules with fields of the packet is used. The fields of the packet usually include a 5-tuple where a typical 5-tuple consists of source address, source port, destination address, destination port, and protocol. For example, a low-level packet processing method compares the 5-tuple defined in the rule with the 5-tuple listed in the packet. If there is a match, a rule or rules may be fetched from a rule database for the packet treatment.

The conventional low-level packet processing method for implementing a policy is not an optimal process for a network administrator. A problem with the current method is that the method is difficult to maintain and update. Another problem with the low-level packet processing method is that the method makes it difficult to add and delete a machine or system. Accordingly, there is a need for a high-level packet processing method that simplifies the process for implementing a network policy.

SUMMARY OF THE INVENTION

At least one source address is grouped in a source group and at least one destination address is grouped in a destination group. In addition, at least one source port, one destination port, and one protocol are grouped in a protocol group. In this embodiment, at least one rule is identified according to the source group, destination group, or protocol group. After identifying the rule or rules, specific treatment for the packet is determined according to the rule. After identifying the rule, specific treatment for the packet during the network transmission is identified in response to the rule or rules.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
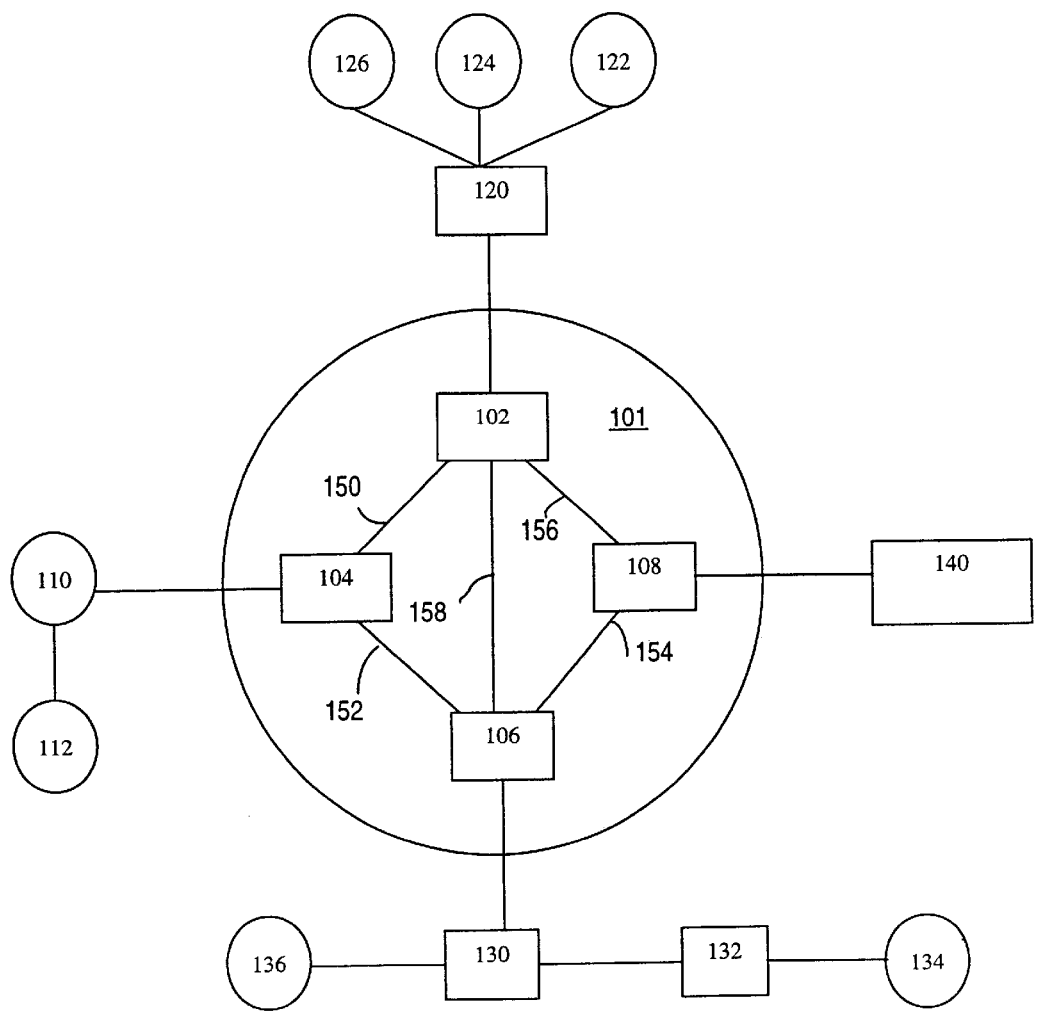
FIG. 1 illustrates one embodiment of a network having various hosts and nodes.

A method and a system for classifying a packet used in a network communication are described.

In the following description, for purposes of explanation, numerous specific details are set forth in order to provide a thorough understanding of the present invention. It will be apparent, however, to one of ordinary skill in the art that the present invention can be practiced without these specific details. In other instances, well-known structures and devices are shown in block diagram form in order to avoid obscuring the present invention.

Some portions of the detailed descriptions that follow are presented in terms of processes and symbolic representations of operations on data bits within a computer memory. These processing descriptions and representations are the tools used by those of ordinary skill in the data processing arts to most effectively convey the substance of their work to others of ordinary skill in the art. A process is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, et. cetera.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying", et. cetera, refers to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Overview

A method and mechanism of grouping packet parameters for classifying a packet used in a network communication is disclosed. Each packet traveling across a network is required to be classified so that the network administrator can provide adequate controls, such as, for example, quality of service ("QOS") and security requirements, for the packet. The network administrator, in one embodiment, is an entity that controls and monitors the network communications or traffic. In this embodiment, the network administrator groups various packet parameters and obtains rules and conditions according to the grouped packet parameters, also referred to herein as group parameters, and uses the rules and conditions to identify specific packet treatment.

In one embodiment, three groups are created, namely, a source group, a destination group, and a protocol group. The source group contains source addresses and the destination group includes destination addresses. A source address, in one embodiment, specifies a network node or computer that initiates or sends the packet. A destination address, in another embodiment, specifies a network node that receives the packet. Also, the protocol group contains source ports, destination ports, and protocols.

A port is typically used to facilitate network services. When a computer is coupled with another computer to provide a particular service, an end-to-end connection is established. At each end of the connection, a socket is set up where the socket is created at a particular port number. In one embodiment, a source port initiates the packet, while a destination port receives the packet.

The protocol is a set of rules or formats that two or more machines have to follow to exchange their messages. Protocols, such as, for example, TCP/IP, may describe low-level details of computer to computer interfaces or high-level exchanges between programs. Other protocols, such as, for example, OSI, Novell's IPX/SPX, AppleTalk, and IBM SNA, may also be used for the present invention.

Once the source, destination, and protocol groups are established, the corresponding rules and conditions can be identified according to the groups. In one embodiment, a rule is a set of predefined codes that are used to manage the network communication or network traffic. Similarly, conditions, in another embodiment, may be dynamically formed for controlling the network traffic. After the rules and conditions are identified, a specific packet treatment is applied to the packet when it travels across the network.

The inventive mechanism providing group parameters uses a high-level packet processing method enhancing network traffic efficiency, because the network administrator only needs to manage the group parameters. This is because the group parameters can be independently maintained from the rules. Accordingly, the presently claimed method and mechanism using group parameters reduces network misconfigurations and increases the efficiency of the network communication.

FIG. 1 illustrates one embodiment of a network configuration 100 having various nodes and hosts. Referring to FIG. 1, a network 101, hosts 120, 130, 132, 140, and nodes 110, 112 122, 124, 126, 134, and 136 are shown. A host is usually a host system, such as, for example, a conventional computer or a cluster of computers, and can support multiple nodes and sub-hosts. A function of the host is to distribute various packets to various nodes that attach to the host.

A node is a connecting point on a network where a device or devices can be attached to the node. A typical device can be a PC "personal computer", a printer, a fax machine, a telephone, and the like. A node can also connect to another node or nodes.

Network 101 contains four network servers 102, 104, 106, and 108, which are interconnected using various conventional connections 150–158. In one embodiment, network 101 is the Internet and the network may contain more than four servers. In this embodiment, server 102 is connected to server 104, 106, and 108 using connection 150, 158, and 156, respectively. Also, server 106 is connected to servers 104 and 108 using connections 152 and 154, respectively.

In one embodiment, network 101 is connected to hosts 120, 130, 140 and node 110 using conventional network connections. In this embodiment, while host 120 is connected to nodes 122, 124, and 126, host 130 is connected to node 136 and host 132. Host 132 is further connected to node 134 and node 110 is connected to node 112. Other nodes and hosts can be connected to network 101, but they are not necessary to understanding the invention.

Each node or host can access or communicate with any other node or host on the network. When a source node, in one embodiment, sends a packet to a destination node, the packet may have several alternative paths or routes to reach the destination node. In other words, a packet, which is sent from a source node, may have options to take one of many paths or routes to reach the destination node or host. However, a different path or route contains different characteristics, which includes, but is not limited to, speed of the packet in transmission and security requirements.

For example, host 130 sends a packet to host 102 where the packet is first sent to server 106. The next step is to send the packet to server 102 from server 106. The packet has three alternative paths to reach server 102. The first path is to send the packet from server 106 to server 102 via server 104 using connections 152 and 150. The second path is to send the packet from server 106 to server 102 via server 108 using connections 154 and 156. The third path is to send the packet directly from server 106 to 102 using connection 158. The third path may be a preferred path, in this example, because the packet takes less hops between servers to reach the destination server and consequently, the packet may take less time to reach server 102. Once the packet reaches server 102, node 120 receives the packet from server 102. Accordingly, the network administrator may allow the packet to take the third path if the packet has a high priority status and allows the packet to take the first or second path if the packet has a low priority status.

Network 101 may have more than four servers and more paths may be available to a packet to reach the destination node. Since different path offers different performance, the network administrator needs various rules and conditions to manage and control overall network communication performance. Rules and conditions commonly involve QOS, security requirements, and the like.

Figure 2:
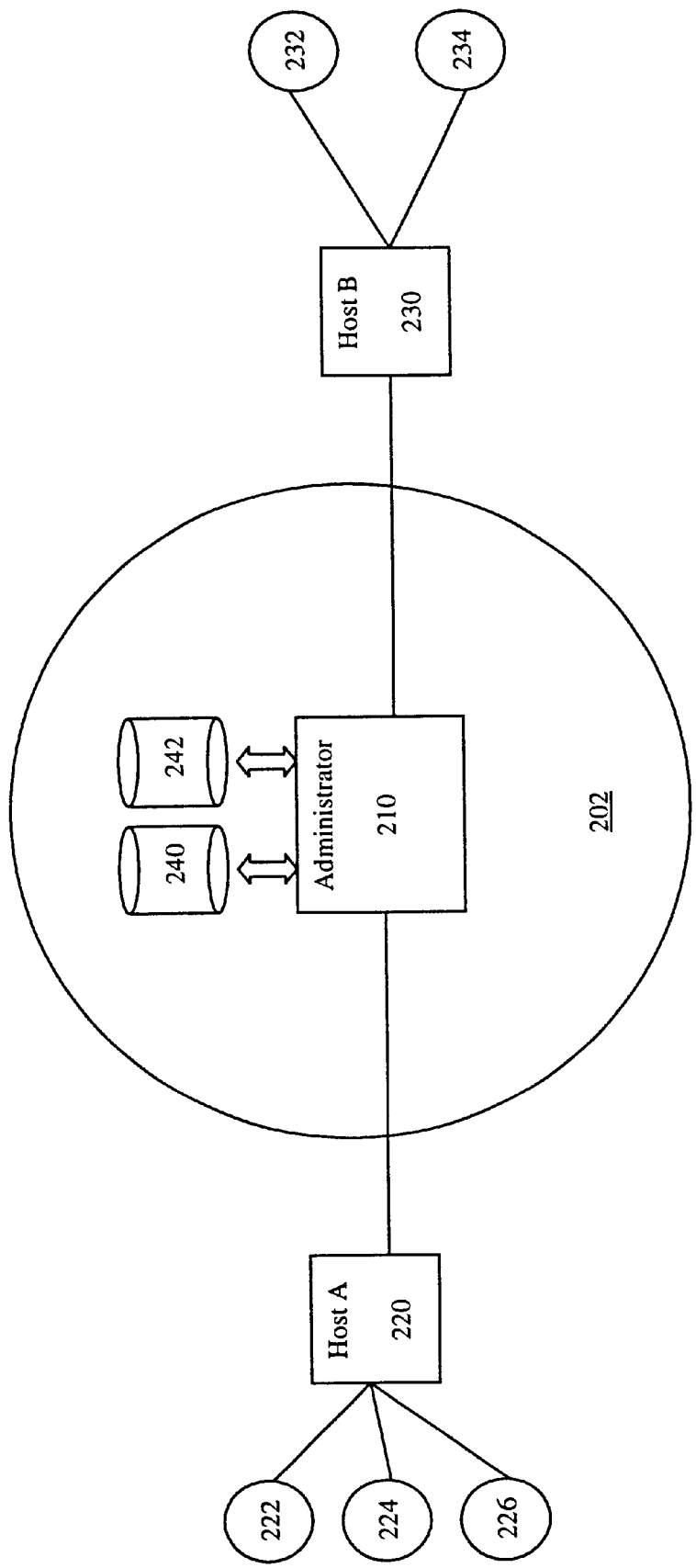
FIG. 2 illustrates one embodiment of a network configuration including a network administrator.

FIG. 2 illustrates one embodiment of a network configuration 200 with an administrator. Referring to FIG. 2, a network 202, a host A 220, and a host B 230 are shown. Host A 220 is further connected to nodes 222, 224, and 226, and host B 230 is connected to nodes 232 and 234. Network 202 further includes an administrator 210, a rule database 240, and a condition database 242.

In one embodiment, administrator 210 could be a network server, network router, or a cluster of network servers. Rule database 240 contains predefined rules for managing the network communication or network traffic. Similarly, condition database 242 contains condition parameters, which can be used to compile conditions dynamically depending on packet and condition parameters, for controlling the network traffic.

Referring to FIG. 2, administrator 210 can be considered a third party that facilitates the network communication between host A 220 and host B 230. In one embodiment, administrator 210 provides security requirements and/or QOS to each packet that travels between host A 220 and host B 230. Different sets of security requirements and/or QOS may be used for different packets depending on the group parameters. For example, a packet initiated by node 222 may require different security requirements and/or QOS from a packet initiated by node 224.

In operation, administrator 210 identifies group parameters associated with a packet and fetches rules and conditions according to identified group parameters. Specific packet treatment is identified according to the rules and conditions. The group parameters are established and maintained by administrator 210.

Group parameters provide a higher-level abstraction that enhance the efficiency of network communication and reduce the mis-configuration of the network communication. For example, a low-level control method used in the past is listed as follows.

if ((source_address equals a1) or (source_address equals a2))
        and ((destination_address equals d1) or (destination_address equals d2))
        and ((source_port equals sp1) or (source_port equals sp2))
        and ((destination_port equals dp1) or (destination_port equals dp2))
        and (protocol equals p)
    then perform some action In which a1 and a2 are source addresses, d1 and d2 are destination addresses, sp1 and sp2 are source ports, dp1 and dp2 are destination ports, and p is protocol. As can be seen, the low-level control method contains many terms that are difficult to maintain and update.

In contrast, the high-level control method, which contains the same information as the above listed terms using the low-level control method, using group parameters can be shown as follows.

SourceGroup=a1, a2
    DestinationGroup=d1, d2
    ProtocolGroup=(sp1, dp1, p), (sp2, dp2, p)
    When sourceGroup initiates to DestinationGroup speaking ProtocolGroup Perform some action As can be seen, using group parameters simplifies the number of terms and consequently, it is easier for the administrator 210 to maintain and update. More specifically, it is easy to add or delete numbers or systems or machines, in a group.

In one embodiment, the administrator allows a user to form a working group. The working group may contain hosts, nodes, systems or machines and each member within the working group will be treated the same by the administrator. Thus, using working group together with group parameters can further enhance the capability of the network administrator. More specifically, it is easy to add or delete members or systems, or machines, in a group.

Figure 3:
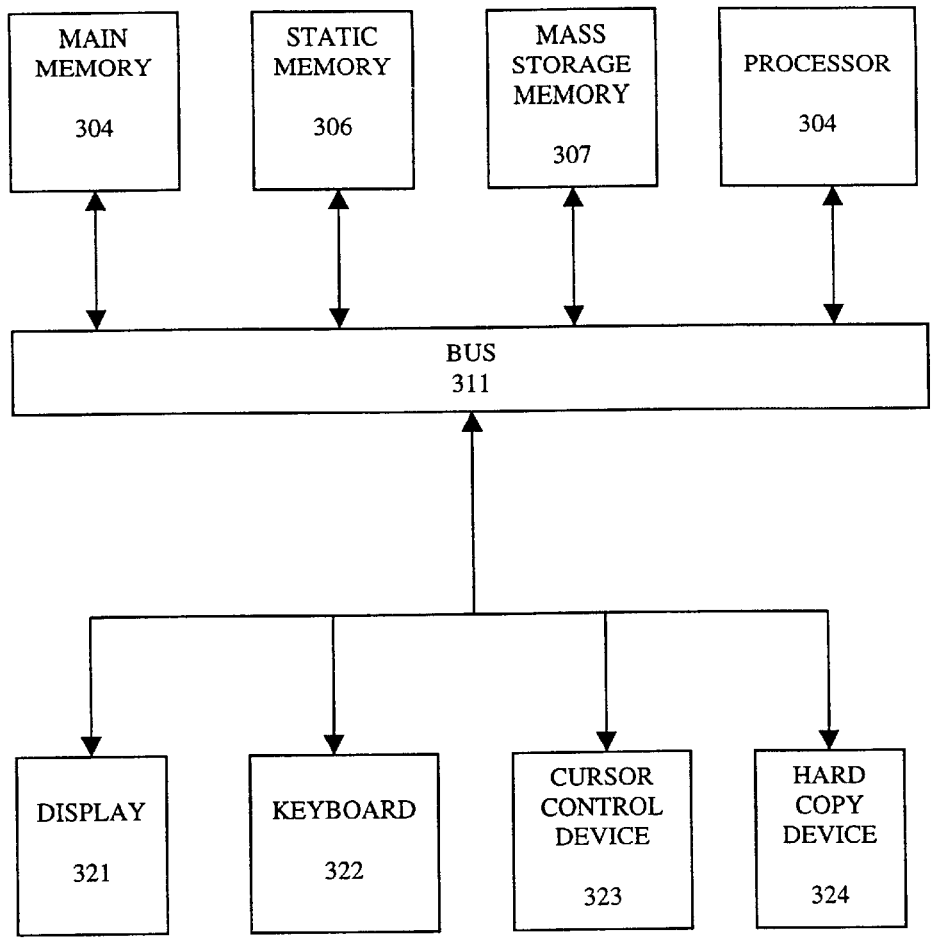
FIG. 3 illustrates one embodiment of a network system used to support network traffic.

FIG. 3 illustrates one embodiment of a system 300 which may be used to monitor network traffic. System 300 comprises a bus or other communication means 311 for communicating information, and a processor 302 coupled with bus 311 for processing information. Processor 302 includes microprocessor, but is not limited to a microprocessor, such as an Intel brand Architecture Microprocessor, manufactured by Intel Corporation of Santa Clara, Calif., the corporate assignee of the present invention. Processor 302 may also be another processor such as the PowerPC™, Alpha™, and the like.

System 300 further comprises a random access memory (RAM), or other dynamic storage device 304 (referred to as main memory) coupled to bus 311 for storing information and instructions to be executed by processor 302. Main memory 304 also may be used for storing temporary variables or other intermediate information during execution of instructions by processor 302. Digital system 300 also comprises a read only memory (ROM) and/or other static storage device 306 coupled to bus 311 for storing static information and instructions for processor 302, and a data storage device 307, such as a magnetic disk or optical disk and its corresponding disk drive. Data storage device 307 is coupled to bus 111 for storing information and instructions.

Digital system 300 may further be coupled to a display device 321, such as a cathode ray tube (CRT) or liquid crystal display (LCD), coupled to bus 311 for displaying information to a computer user. An alphanumeric input device 322, including alphanumeric and other keys, may also be coupled to bus 311 for communicating information and command selections to processor 302. An additional user input device is cursor control 323, such as a mouse, trackball, trackpad, stylus, or cursor direction keys, coupled to bus 311 for communicating direction information and command selections to processor 302, and for controlling cursor movement on display 321.

Another device which may be coupled to bus 311 is hard copy device 324, which may be used for printing instructions, data, or other information on a medium such as paper, film, or similar types of media. Furthermore, a sound recording and playback device, such as a speaker and/or microphone may optionally be coupled to bus 311 for audio interfacing with computer system 100. Note that any or all of the components of system 300 and associated hardware may be used in the present invention. However, it can be appreciated that other configurations of the computer system may include some or all of the devices.

Figure 4:
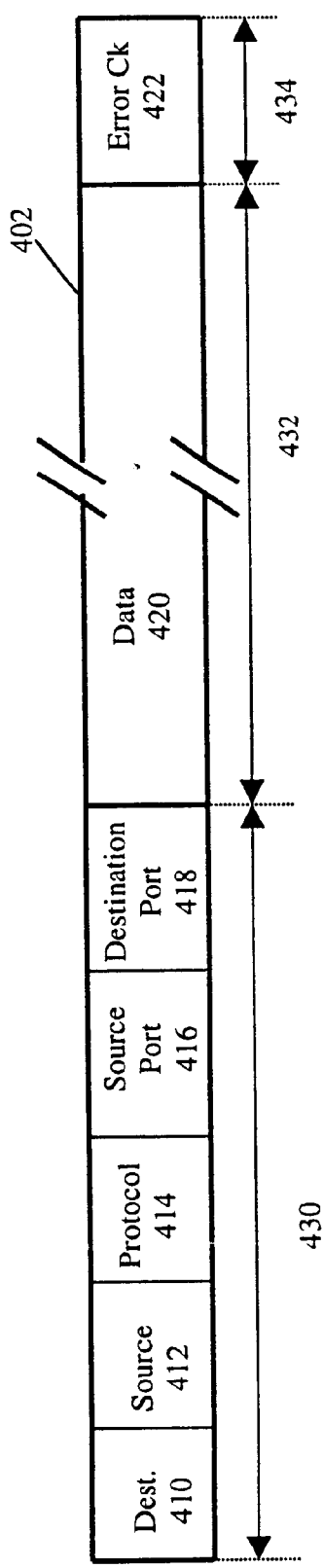
FIG. 4 illustrates one embodiment of a data packet configuration.

FIG. 4 illustrates one embodiment of a packet configuration 400, in which it shows a head portion 430, a data portion 432, and an error-checking portion 434. In one embodiment, head portion 430 includes, among other components, a 5-tuple, which consists of a destination address 410, a source address 412, a protocol 414, a source port 416, and a destination port 418. Data portion 432 usually contains data 420. Error-checking portion 434 contains check bits 422, also referred to as parity bits, which are used to ensure the integrity of the packet.

In a network communication, data to be transferred across the network is divided into packets. Each packet carries an identification that enables the network infrastructure (i.e., routers) to know how to route the packet to the specific destination. For example, a file to be transmitted between two nodes or hosts may be divided into multiple packets. Once the packets are compiled, they are sent across the network one at a time. The network infrastructure delivers the packets to a specific destination node, where the file is reassembled from the packets. It is common that different packets may take different paths to reach the destination node.

Figure 5:
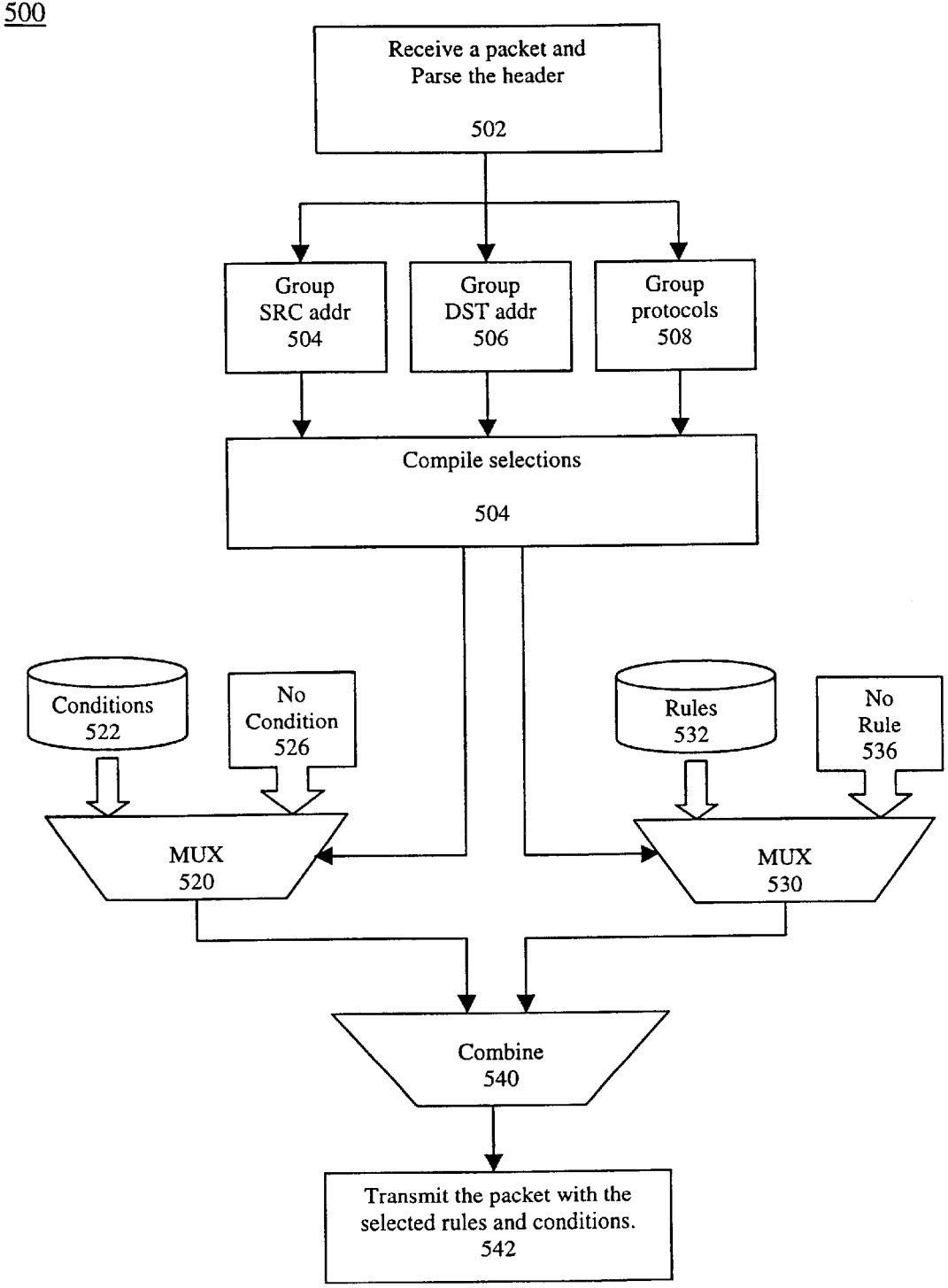
FIG. 5 is a block diagram illustrating an embodiment of a process for selecting rules and conditions according to group parameters.

FIG. 5 is a block diagram 500 illustrating an embodiment of a process for selecting rules and conditions according to group parameters. Block 502 shows a process of receiving a packet, which is subsequently parsed into different portions. Once the head portion of the packet is identified, source addresses are grouped at block 504 while destination addresses are grouped at block 506. Moreover, protocols, source ports, and destination ports are grouped at block 508.

The results of the grouping are fed to block 504 where a rule select signal and a condition select signal are generated. The rule and condition select signals are fed to block 520 and block 530, respectively, for selecting rules and conditions. In one embodiment, block 520 is a multiplexer where conditions from block 522 could be selected. Block 530 is also a multiplexer where rules from block 532 may be selected.

The outputs from block 520 and 530 are fed to block 540, which combines the selected rules and conditions so that they can be used later for controlling the packet transfer. Block 542 transmits the packet using the selected rules and conditions to control the network communication.

Figure 6:
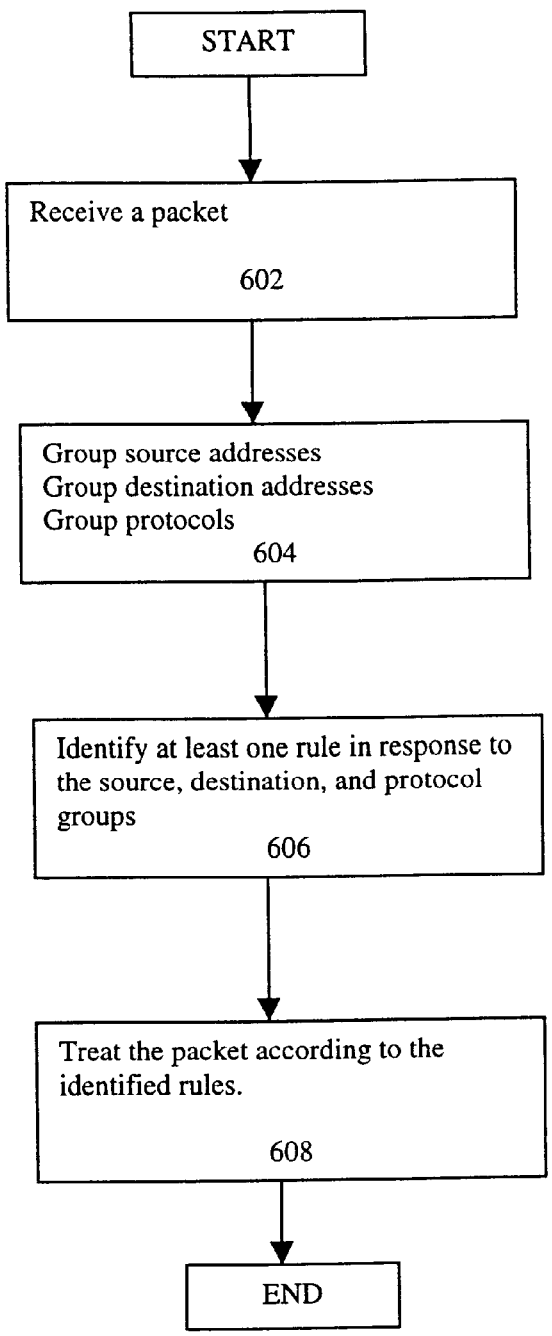
FIG. 6 is a flowchart illustrating an embodiment of a process for selecting rules and conditions according to group parameters.

FIG. 6 is a flowchart 600 illustrating an embodiment of a process for selecting rules and conditions according to group parameters. A process begins at the start block and proceeds to block 602 where a packet is received. At block 604, the process groups source addresses, destination addresses, protocols, source ports, and destination ports into a source, destination, and protocol groups to form group parameters. After grouping, the process proceeds from block 604 to block 606 where at least one rule is identified according to the group parameters. At block 608, the process provides communication treatments, such as, for example, security requirements and QOS, to the packet according to the identified rules and conditions. After block 608, the process ends.

Whereas many alterations and modifications of the present invention will no doubt become apparent to a person of ordinary skill in the art after having read the foregoing description, it is to be understood that the various embodiments shown and described by way of illustration are in no way intended to be considered limiting. Therefore, references to details of various embodiments are not intended to limit the scope of the claims, which in themselves recites only those features regarded as essential to the invention.

Thus, a method and a system for classifying a packet using group parameters have been described.

What is claimed is:

1. A method for classifying a packet comprising:
   grouping at least one source address in a source group, the at least one source address being extracted from a received packet;
   grouping at least one destination address in a destination group, the at least one destination address being extracted from the received packet;
   grouping at least one source port, one destination port, and one protocol in a protocol group, the at least one source port, the one destination port and the one protocol being extracted from the received packet;
   identifying at least one rule according to results of the grouping of at least one of said source group, destination group, and protocol group; and
   providing specific communication treatment associated with said rule to said packet.

2. The method of claim 1 further comprising:
   creating said source group;
   creating said destination group; and
   creating said protocol group.

3. The method of claim 1, further comprising allowing an entity to be added to said source group, destination group, and protocol group.

4. The method of claim 3, wherein said allowing an entity to be added further includes adding a system to said source group, destination group, and protocol group.

5. The method of claim 1, further comprising providing packet security requirements to said packet in response to said rule.

6. The method of claim 1, further comprising creating a working group for grouping predefined machines.

7. The method of claim 6, wherein said creating a working group further includes identifying at least one rule in response to said working group.

8. The method of claim 7, wherein said working group further includes:
   allowing an entity to be added to said working group; and
   permitting an entity to be deleted from said working group.

9. The method of claim 1 further comprising creating conditions in response to at least one of said source group, destination group, and protocol group.

10. The method of claim 1, wherein said packet includes creating a packet utilizing TCP/IP protocols.

11. The method of claim 1, wherein said rules include identifying a specific action to be performed for said packet.

12. A system comprising:
   a processor;
   a storage device, coupled to said processor, having stored therein a programming codes for classifying a packet, said programming codes, when executed by said processor, causes said processor to perform:
   grouping at least one source address in a source group, the at least one source address being extracted from a received packet;
   grouping at least one destination address in a destination group, the at least one destination address being extracted from the received packet;
   grouping at least one source port, one destination port, and one protocol in a protocol group, the at least one source port, the one destination port and the one protocol being extracted from the received packet;
   identifying at least one rule according to results of the grouping of at least one of said source group, destination group, and protocol group; and
   providing specific communication treatment associated with said rule to said packet.

13. The system of claim 12, wherein said source address is one of an IP address, fully qualified domain name, address range, and address subnet.

14. The system of claim 12, wherein said destination address is one of an IP address, fully qualified domain name, address range, and address subnet.

15. The system of claim 12, wherein said packet is a TCP/IP packet.

16. The system of claim 12, wherein said rule determines actions to perform for said packet, wherein said action is one of a set of security requirements and quality of service.

17. A system for classifying a packet comprising:
   means for grouping at least one source address in a source group, the at least one source address being extracted from a received packet;
   means for grouping at least one destination address in a destination group, the at least one destination address being extracted from the received packet;
   means for grouping at least one source port, one destination port, and one protocol in a protocol group, the at least one source port, the one destination port and the one protocol being extracted from the received packet;

means for identifying at least one rule according to results of the grouping of at least one of said source group, destination group, and protocol group; and means for providing specific communication treatment associated with said rule to said packet.

18. The system of claim 17, further comprising:

means for creating said source group;

means for creating said destination group; and means for creating said protocol group.

19. The system of claim 17, further comprising means for allowing an entity to be added to said source group, destination group, and protocol group.

20. The system of claim 19, wherein said means for allowing an entity to be added further includes means for adding a system to said source group, destination group, and protocol group.

21. The system of claim 17, further comprising means for providing security to said packet in response to said rule.

22. The system of claim 17, further comprising means for creating a working group for grouping predefined machines.

23. The system of claim 22, wherein said means for creating a working group further includes means for identifying at least one rule in response to said working group.

24. The system of claim 23, wherein said means for working group further includes:

means for allowing an entity to be added to said working group; and means for permitting an entity to be deleted from said working group.

25. An article of manufacture for use in a digital processing system for network communication, the article of manufacture comprising a digital processing system usable medium having readable program code embodied in the medium, the program code comprising:

grouping at least one source address in a source group, the at least one source address being extracted from a received packet;

grouping at least one destination address in a destination group, the at least one destination address being extracted from the received packet;

grouping at least one source port, one destination port, and one protocol in a protocol group, the at least one source port, the one destination port and the one protocol being extracted from the received packet;

identifying at least one rule according to results of the grouping of at least one of said source group, destination group, and protocol group; and providing specific communication treatment associated with said rule to said packet.

26. The article of manufacture of claim 25, further comprising:

creating said source group;

creating said destination group; and creating said protocol group.

27. The article of manufacture of claim 25, further comprising allowing an entity to be added to said source group, destination group, and protocol group.

28. The article of manufacture of claim 25, wherein said allowing an entity to be added further includes adding a system to said source group, destination group, and protocol group.

* * * * *